July 29, 1958     H. F. STEPHENSON     2,845,159
SPRAG CLUTCH
Filed Feb. 18, 1954
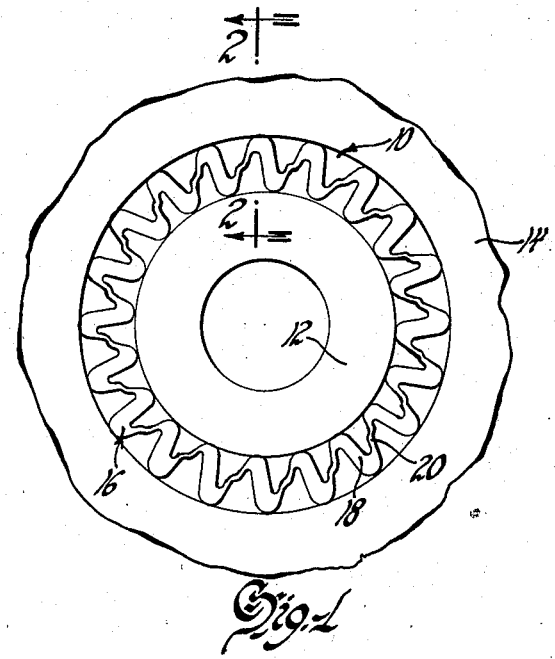
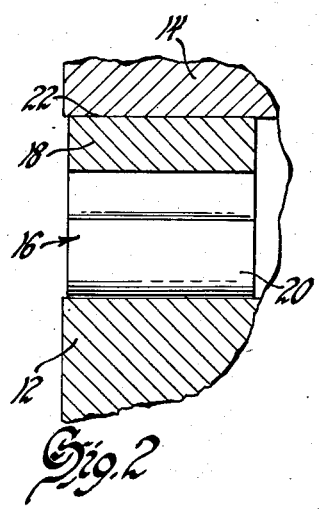
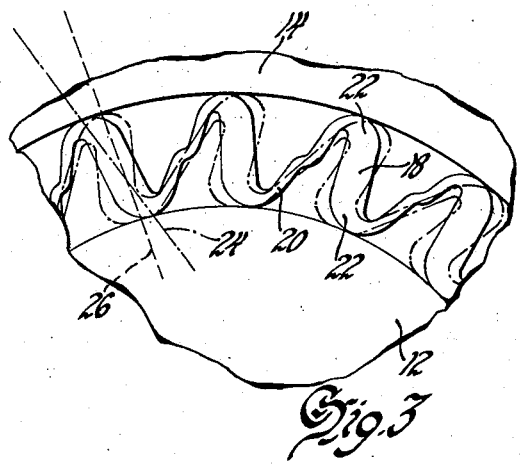
INVENTOR
Howard F. Stephenson
BY Edward H. Goodrich
ATTORNEY United States Patent Office 2,845,159
Patented July 29, 1958

2,845,159

SPRAG CLUTCH

Howard F. Stephenson, Plainville, Conn., assignor to General Motors Corporation, Detroit, Mich., a corporation of Delaware Application February 18, 1954, Serial No. 411,045

2 Claims. (Cl. 192—45.2)

This invention relates to sprag clutches and particularly to a cageless sprag type clutch for coupling a pair of concentric cylindrical races together.

In sprag type clutches it is desirable to provide a plurality of grippers, wedges, or sprags held in spaced relation to one another and biased for engagement with the concentric cylindrical races between which they are adapted to be disposed. Each sprag is usually a separate element retained in a cage and disposed in near radial relation to the axis of rotation of the concentric races. Relative movement of the races is allowed in one direction by a sliding past or overrunning of the sprag elements. A reversal of relative movement of the races causes the sprags to be frictionally engaged and to be cocked or rotated into wedging engagement between the races to allow for the transmission of torque therebetween.

Heretofore each sprag or wedging element has generally been a separate member which has been engaged by or retained within a cage or other retainer member. The cage or retainer member has been adapted to accommodate a plurality of sprags which are required to be individually assembled in the cage and which are thereby held in spaced relation to one another. Means have also been provided for biasing the sprags in engagement with the two concentric cylindrical races but have been either separate means or in some instances integrally a part of the cage member. Aside from the consideration of dependability, efficiency, compactness and responsiveness of such clutches manufacturing and assembly problems are involved as well. The number of separate elements, the necessary machine operations, the cost of each element and operation, and the labor and time consumed in assembly are reflected in the number of clutches which may be produced, their quality and their ultimate cost to the consumer.

It is now proposed to provide a sprag type clutch which includes a single element having a plurality of sprag like portions spaced apart and biased for engagement with the concentric races by intermediate resilient portions. The resilient portion between adjacent sprag like portions is adapted to yield to allow relative movement of the races in one direction and at the same time to bias the sprag portions for sliding engagement with the races. A reversal of relative movement between the races causes frictional engagement of the races with the sprags, rotating the sprags into wedging engagement with the races. This clutch obviates the need of separate sprag retaining means, spacers, or biasing elements, may be easily fabricated, and is readily assembled in a minimum of time.

In the drawing:

Figure 1 is a side elevational view of a sprag type clutch embodying the principles of the present invention.

Figure 2 is a cross-sectional view of the sprag type clutch taken in the plane of line 2—2 of Figure 1 and looking in the direction of the arrows thereon.

Figure 3 is a fragmentary and enlarged view of the proposed one-way clutch of Figure 1 showing the clutch in torque transmitting disposition by phantom lines.

In the present invention the one-way sprag type clutch 10 is adapted to be disposed between substantially cylindrical and concentrically arranged races 12 and 14. The clutch 10 is formed from a tubular or cylindrical member 16 which has alternate thick and thin portions 18 and 20 respectively formed circumferentially therearound. The tubular member 16 is crimped, folded or otherwise formed to dispose the alternate portions 18 and 20 thereof in different generally radially inclined directions. The thick portions 18 have great strength and rigidity and are adapted to act as sprags, grippers or wedges. The thin portions 20 are resilient and spring like and are adapted to act as biasing elements. The clutch 10 thus includes a plurality of sprag like elements 18 held in spaced relation to one another and biased for engagement with the concentric races 12 and 14 by intermediate spring like portions 20.

The thick portions 18 formed about the cylindrical member 16 and adapted to act as sprags have cam surfaces 22 formed on diagonally opposite ends which are contiguous with the spring like portions 20. The spring like portions 20 which respectively form links integrally connected at their ends to the adjacent sprags are thus adapted to act upon the cam surfaces 22 and uniformly urge such surfaces into simultaneous engagement with the cylindrical races 12 and 14.

The resilient intermediate portions 20 of the cylindrical member 16 forming the clutch 10 are adapted to be readily deflected or loaded when the clutch is placed between the races 12 and 14. The spring like portions 20 thereby are adapted to retain the sprag like portions 18 in biased engagement with the races 12 and 14.

In the operation of the clutch 10, relative rotational movement is allowed between the races 12 and 14 in one rotational direction; namely where the relative movement urges each sprag 18 against the adjacent spring like portions 20. In such a direction, the outer race 14 is free to slip over or slide across the sprags 18. At this time, the resiliently yieldable spring portions 20 simultaneously deflect and permit the sprag portions 18 to tilt away from their normally wedged driving engagement with the raceways. When the relative direction of rotation is reversed, both races 12 and 14 frictionally engage the sprag like members 18 causing them to simultaneously tilt or rotate into wedging engagement between the two races 12 and 14. This tilting action of the sprags is individually aided by the biasing spring portions 20. As shown in Figure 3, the normal plane of contact between the sprag 18 and races 12 and 14 is as per line 24 which allows an overrunning condition. When the sprag is frictionally engaged and rotated into a wedged or locked position as shown in phantom, the sprag lies substantially on the plane of line 26.

I claim:

1. A sprag clutch comprising a pair of relatively rotatable members respectively provided with inner and outer opposing raceways in radial spaced coaxial relation, an annular clutch member having a continuous wave contour throughout its periphery, the clutch member including circumferentially spaced sprags and spring portions, each sprag having inner and outer rounded ends for raceway engagement, each spring member extending between a pair of adjacent sprags and having inner and outer ends respectively integral with the inner and outer rounded ends of the adjacent sprags, the interconnected sprags and springs being in divergent relation with respect to a radius of the clutch member passing through the interconnected ends of the sprag and spring member, each sprag being substantially rigid, and each spring member being resiliently flexible and thinner than a sprag and yieldably urging the rounded sprag ends individually and simultaneously into raceway engagement.

2. A sprag clutch comprising a pair of relatively rotatable members respectively provided with inner and outer opposing cylindrical raceways in radially spaced coaxial relation, an annular clutch member having an uninterrupted wave contour throughout its periphery, the clutch member including circumferentially spaced sprags and circumferentially spaced generally flat springs in alternating interconnected relation, inner and outer rounded ends on each sprag respectively engaging the inner and outer raceways, each spring angularly extending between a pair of adjacent sprags and having inner and outer ends respectively integral with the inner and outer ends of the adjacent sprags, each pair of adjacent sprags and springs being in divergent relation to a clutch radius passing through the rounded end of the sprag joining said members, each spring being thinner than the adjacent sprag and resiliently urging the adjacent sprag into driving relation between the raceways, and said springs collectively serving to simultaneously shift all sprags into or out of raceway driving relation in response to the shifting movement of an individual sprag.

References Cited in the file of this patent

UNITED STATES PATENTS

| | | |
|---|---|---|
| 2,453,506 | Gruenberg | Nov. 9, 1948 |
| 2,624,436 | Gamble | Jan. 6, 1953 |
| 2,689,633 | Turner | Sept. 21, 1954 |

FOREIGN PATENTS

| | | |
|---|---|---|
| 298,673 | Great Britain | Oct. 15, 1928 |